No. 805,253. PATENTED NOV. 21, 1905.
E. F. W. ALEXANDERSON.
VOLTAGE REGULATOR.
APPLICATION FILED MAR. 10, 1905.

2 SHEETS—SHEET 1.

Witnesses
Elnathan E. Briggs.
Helen Orford.

Inventor:
Ernst F. W. Alexanderson.
by Albert G. Davis
Atty.

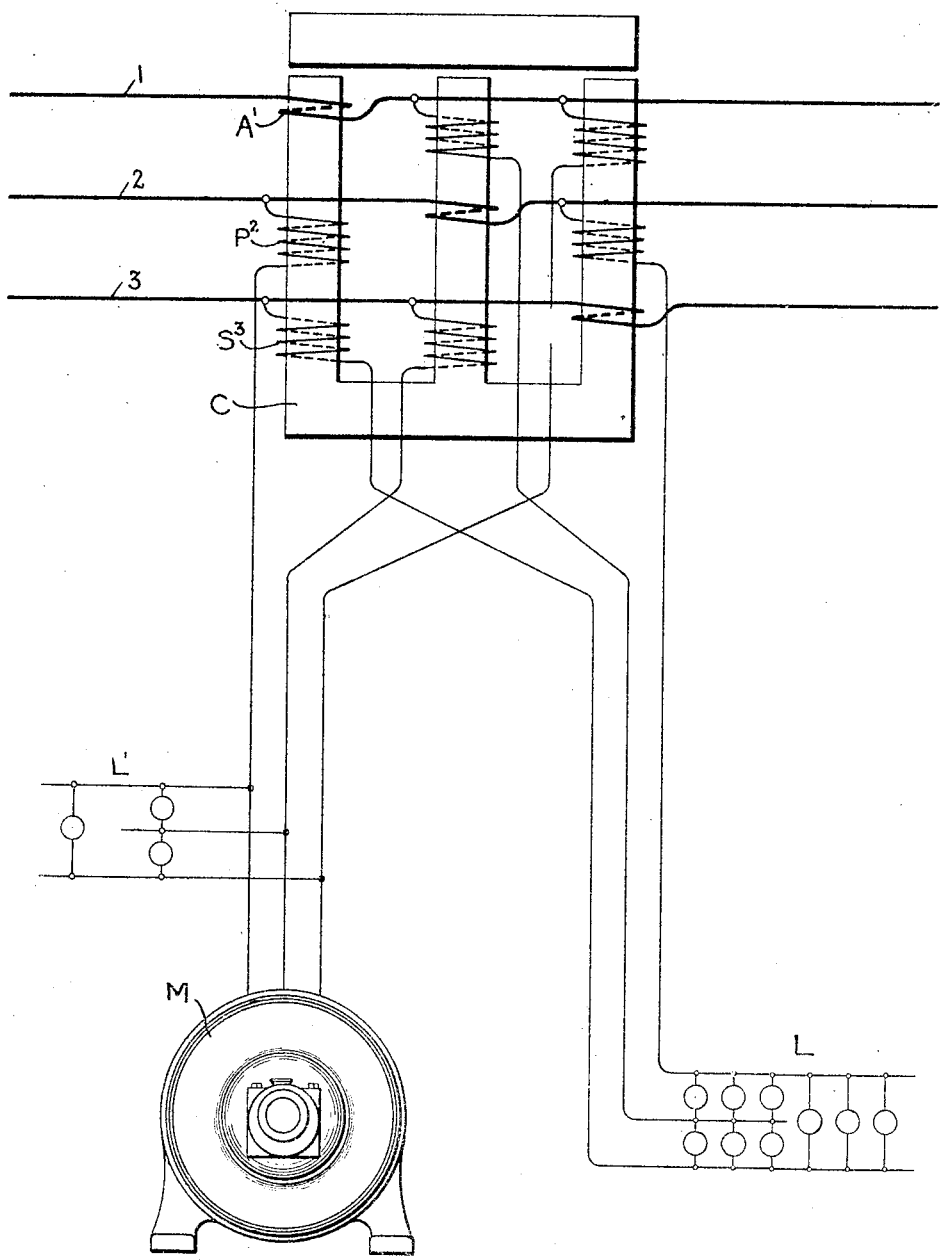

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

VOLTAGE-REGULATOR.

No. 805,253.          Specification of Letters Patent.          Patented Nov. 21, 1905.

Application filed March 10, 1905. Serial No. 249,400.

*To all whom it may concern:*

Be it known that I, ERNST F. W. ALEXANDERSON, a subject of the King of Sweden and Norway, residing at Schenectady, county of Schenectady, State of New York, have invented certain new and useful Improvements in Voltage-Regulators, of which the following is a specification.

My invention relates to voltage regulation of alternating-current circuits, and is particularly applicable to circuits supplied from polyphase alternating-current systems. Its object is to provide novel and efficient means for maintaining a constant potential on a circuit which is connected in parallel with a second circuit in which the current fluctuates over wide ranges.

My invention consists in providing a novel form of boosting-transformer so arranged that the boosting voltage is substantially in phase with the line voltage impressed on the circuit to be regulated and at the same time the reactance drop in the secondary circuit of the boosting-transformer due to current-flow in the regulated circuit is substantially in quadrature with the line voltage, so that the voltage in the local circuit to be regulated is practically unaffected thereby, even with great variations of current-flow in the local circuit. To secure these results, I so arrange the transformer that its secondary circuit is highly reactive, so that the drop is substantially in quadrature with the secondary terminal voltage, and so connect the primary of the transformer that the primary current is of the proper phase to bring the secondary terminal voltage substantially into phase with the voltage impressed on the local circuit.

More specifically stated, my invention consists in the combination, with a circuit energized from one of the phases of a polyphase system, of a transformer of the open-core type having a secondary winding in series with said circuit and with its primary winding connected in a different circuit and in a different phase from that to which said circuit is connected.

My invention further consists in a novel arrangement of a three-phase series transformer with the windings for each phase arranged in the manner above stated.

My invention will best be understood by reference to the following drawings, in which—

Figure 1:
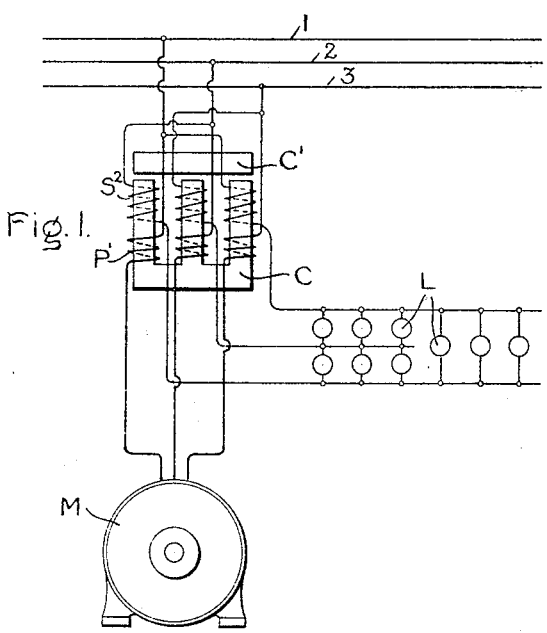
Figure 2:
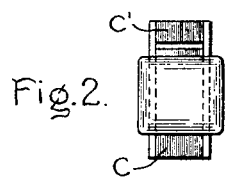
Figure 3:
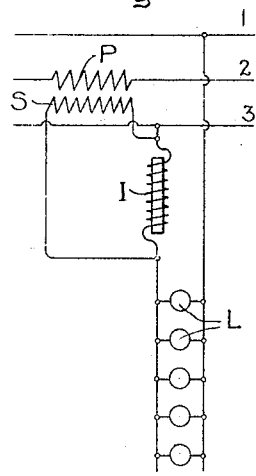
Figure 4:
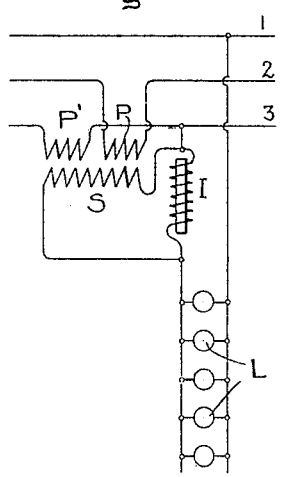
Figure 5:
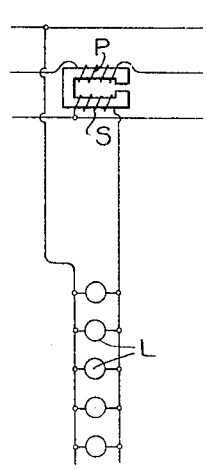

Figure 1 shows somewhat diagrammatically a three-phase boosting-transformer arranged in accordance with my invention. Fig. 2 shows a side view of the transformer, showing the arrangement of the core. Figs. 3 to 5 are explanatory diagrams, and Fig. 6 shows a modified form of boosting-transformer arranged in accordance with my invention.

Referring first to Fig. 3, 1, 2, and 3 represent the line-wires of a three-phase system. L represents lamps or other devices connected across the line-wires 1 and 3. P represents the primary of a series transformer connected in line-wire 2. S represents the secondary of the transformer connected across the terminals of an inductance I inserted in series with the lamp-circuit. Let it be assumed that the current varies in the line-wires, so as to vary the line potential impressed on the lamp-circuit, and that it is desired to maintain the voltage on the lamps constant. The current flowing through the primary coil P, if the load on the line-wires is non-inductive, is in quadrature with the line potential across line-wires 1 and 3 which is impressed on the lamp-circuit, and consequently the current in the secondary winding S, which is opposite in phase to the current in the primary winding, is also in quadrature with the lamp-circuit potential. The circuit of the secondary winding S is closed through the inductance I, and if the resistance of this circuit is substantially negligible the potential across its terminals is substantially in quadrature with the current flowing through it, and since this current is in quadrature with the potential impressed on the lamps the potential across the terminals of the inductance I, impressed by the secondary winding S, is substantially in phase with the line potential impressed on the lamps—that is, the boosting potential due to the series transformer is of the proper phase for most efficiently increasing the lamp potential with increasing load on the line-wires, and also since the drop through the reactance I, due to the flow of current through the lamps, is in quadrature with this potential it can have little effect upon the lamp potential, even though the lamp load varies greatly in amount. Consequently if the series transformer is properly proportioned the lamp voltage may be maintained constant regardless of large fluctuations in the current in the line-wires and variations in the line voltage due thereto, as well as of variations in the lamp-current itself.

In the arrangement of Fig. 3 it was assumed that the load upon the line-wires was non-inductive, so that the current in the primary coil of the transformer was in phase with the voltage. If the load on the line-wires is inductive, the same result as has been heretofore described can be obtained by adding a second coil P', as shown in Fig. 4, to the transformer and connecting this in one of the other phases, so that the resultant of the currents in the two primary windings is ninety degrees out of phase with the potential across the line-wires 1 and 3. This modification to meet the requirements where the load is inductive is applicable in the arrangements to be hereinafter described; but for the sake of simplicity it will be assumed in describing these arrangements that the load is in each case non-inductive.

It is not essential that the inductance should be external to the transformer. If a transformer is formed with an air-gap in its magnetic circuit, the result electrically is the same, as is well understood, as if an inductance were connected across the terminals of the secondary winding. Fig. 5 shows diagrammatically such an arrangement in which the external inductance is dispensed with by forming the magnetic core with an air-gap. The operation with this arrangement is precisely the same as has been already described in connection with Fig. 3.

Now, referring to Fig. 1, I shall describe my invention as applied to a three-phase boosting-transformer. In this figure I have represented two circuits connected in parallel to the line-wires 1 2 3, one circuit supplying the lamps L and the other a variable load which is indicated by the motor M. In order to prevent variations in the lamp voltage due to fluctuations in the motor-current, I provide a three-phase transformer with the core arranged in the usual manner, except that an air-gap is inserted in each leg of the magnetic circuit. I have shown the magnetic circuit as composed of two portions C and C'. Core C is formed in the usual manner with three legs, on each of which are mounted a primary and a secondary coil. It will be seen by tracing out the connections that instead of placing the primary and secondary coils of the same phase on the same leg, as is the usual practice, each primary coil is placed on the same leg with the secondary coil of a different phase. Thus the primary coil P', connected to the line-wire 1 and in series with the motor M, is on the same leg as the secondary coil $S^2$, which is connected to line-wire 2 and in series with one phase of the lamp-circuit. Thus each pair of coils acts in precisely the same manner as the single pair of coils shown in Fig. 5, and the boosting potentials impressed upon the several phases of the lamp-circuit are substantially in phase with the respective line voltages impressed on the lamps, while the same advantage as regards the inductive drop in the transformer-windings being in quadrature with the lamp voltages is obtained as in the arrangements of Figs. 3 and 5.

It may sometimes happen that where two circuits are connected in parallel to the same line-wires it is desirable not only to compensate the voltage in one circuit for current fluctuations in the other, but also to boost the voltage on both the circuits to compensate for drop in the line potential due to varying loads on the line. My invention permits of a simple extension to cover such a case as this. In general, any two coils on the same magnetic circuit and connected in different electric circuits may be so connected that the flow of current in either coil will boost the voltage in the other circuit, while the flow of current in the second circuit tends to lower the voltage in the first circuit. Thus if three coils in different electric circuits are placed on the same magnetic circuit they may be so connected that current-flow in two of these coils boosts the voltage in the circuit in which the third coil is connected, while current in the third coil tends to lower the potential in the first two circuits, and as regards the first two coils the current in either may boost the potential in the circuit of the second while the current in the second opposes the voltage in the circuit of the first—that is, coils 1 and 2 may boost coil 3 while coil 3 opposes coils 1 and 2, and coil 1 may boost coil 2 while coil 2 opposes coil 1. Such an arrangement is shown in Fig. 6, in which it is assumed that it is desired not only to compensate for variations in the voltage impressed on the lamps L due to the variations in the current through the circuit of the lamps L' and motor M, but also to compensate for variations in voltage in both circuits due to variations in current in the line-wires 1, 2, and 3. For this purpose a three-phase transformer is used with the magnetic circuit, the same as in Fig 1; but in this case three coils are mounted on each leg of core C and each of the three coils is connected in a different phase from that of the other two. Thus the coil A', connected in the line-wire 1, is mounted on the same leg of core C that carries coil $P^2$, connected to line-wire 2 and in series in the motor-circuit, and coil $S^3$ connected to line-wire 3 and in series with the lamp-circuit. If these coils are properly connected, the current in both coils A' and $P^2$ will boost the lamp-circuit in which coil $S^3$ is connected, while the current in coil $A'$ will also boost the voltage in the circuit of coil $P^2$. Thus the voltage of the lamps L is unaffected by current variations in any of the circuits, and the voltage of the lamps $L'$ and motor M, while affected by current variations in their own circuit and in the circuit of lamps L, is not affected by current variations in the main line-wires.

What I claim as new, and desire to secure by Letters Patent of the United States, is—

1. In combination, an electric circuit, a source of current therefor, a transformer arranged with an open magnetic circuit and having its secondary winding in series with said electric circuit, and means for supplying to the primary of said transformer a current substantially in quadrature with the voltage impressed on said electric circuit and varying in magnitude with the drop in voltage of said source due to variation in amount of current-flow.

2. In combination, a source of polyphase current, two circuits supplied therefrom, and a transformer of the open-core type having a secondary winding in series with one of said circuits and a primary winding in series with a different phase of the second circuit.

3. In combination, a three-phase transmission system, two three-phase circuits supplied in parallel therefrom, and a transformer of the open-core type having a secondary winding in series with one of said circuits and a primary winding in series with a different phase of the second circuit.

4. In combination, a three-phase transmission system, two three-phase circuits supplied therefrom, and a three-phase transformer having an air-gap in each leg of its magnetic circuit and a primary and secondary winding on each leg, the primary windings being connected in series with one of said three-phase circuits and the secondary windings in series with the other, the windings on each leg being connected in different phases of their respective circuits.

5. In combination, a source of current, two circuits supplied therefrom, a transformer arranged to produce a secondary terminal voltage substantially in quadrature with the primary current and having its secondary winding connected in series with one of said circuits, and connections for supplying to the primary winding of said transformer a current substantially in quadrature with the voltage impressed on the circuit in which said secondary winding is connected and varying in amount with the current-flow in the other circuit.

6. In combination, a source of polyphase current, two circuits supplied therefrom, and a transformer arranged to produce a secondary potential substantially in quadrature to the primary current and having its secondary winding connected in series with one of said circuits and its primary winding in series with a different phase of the other circuit.

7. In combination with a plurality of three-phase circuits, a three-phase transformer having an air-gap in each leg of its magnetic circuit, and a plurality of windings on each leg connected in said three-phase circuits, each of the windings on each leg being connected in a different circuit and in a different phase from the other winding or windings on that leg.

8. In combination, a three-phase transmission system, two three-phase circuits supplied therefrom, and a three-phase transformer having a primary and secondary winding on each leg of its magnetic circuit and arranged to produce a secondary terminal voltage substantially in quadrature with the primary current, the primary windings being connected in series with one of said three-phase circuits and the secondary windings in series with the other, the windings on each leg being connected in different phases of their respective circuits.

In witness whereof I have hereunto set my hand this 9th day of March, 1905.

ERNST F. W. ALEXANDERSON.

Witnesses:
BENJAMIN B. HULL,
HELEN ORFORD.